Figure 1:
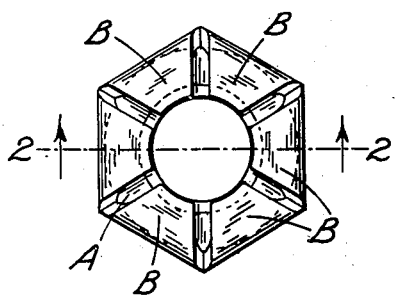

Sept. 24, 1940.     F. A. ODDIE     2,215,560
NUT
Filed June 11, 1938       2 Sheets-Sheet 1

Inventor,
F. A. Oddie,
By,

Sept. 24, 1940.    F. A. ODDIE    2,215,560
NUT
Filed June 11, 1938    2 Sheets-Sheet 2
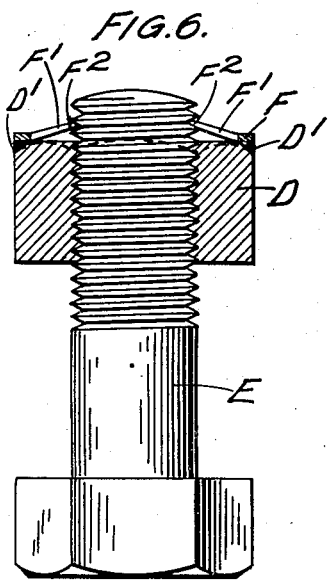
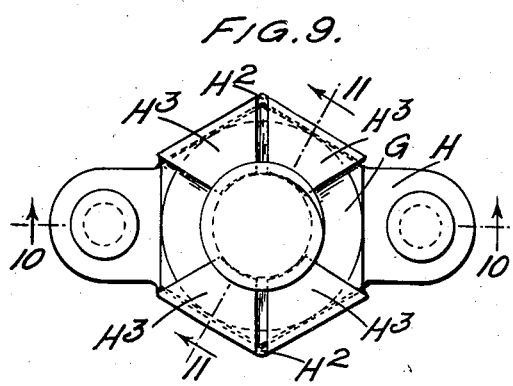
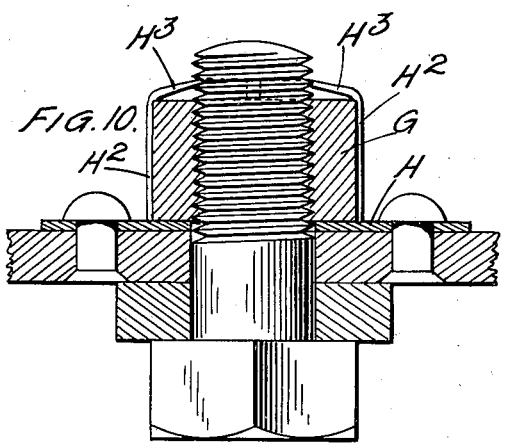
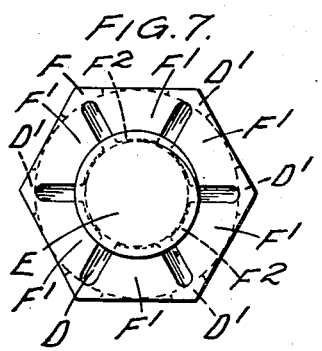
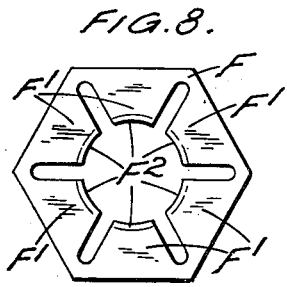
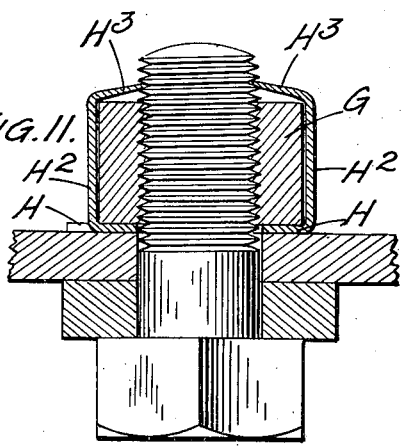
Inventor,
F. A. Oddie Patented Sept. 24, 1940

2,215,560

UNITED STATES PATENT OFFICE 2,215,560

NUT

Fred Albert Oddie, Southampton, England

Application June 11, 1938, Serial No. 213,261
In Great Britain April 9, 1938

1 Claim. (Cl. 151—14)

This invention relates to self-locking nuts and the object of this invention is to provide a self-locking nut which is both simple and cheap to manufacture and automatic and reliable in use.

To this end, in a nut according to the present invention there is combined with the main body part of the nut, one or more flexible metallic tongues, the outer end of each of which is rigid with the body part or a part held from axial and rotational movement relatively to the body part while its inner end extends towards the axis of the bore of the nut to a point nearer this axis than the larger diameter part of the screwthread.

Each tongue is conveniently formed integral at its outer end with the main body part of the nut and where, as would generally be the case, the nut is of hexagonal or other polygonal shape, a tongue preferably extends from each side of the polygon, each tongue preferably being of generally triangular shape with its inner end constituting the apex of the triangle. It is to be understood, however, that the invention may be applied to nuts of other shape, for example circular or milled nuts or butterfly nuts and that, in any case, the tongues or a member carrying them may be formed separately from the body of the nut and connected to this body, for example, by welding or by forming the member carrying the tongues so that it is held from axial and rotational movement relatively to the body of the nut. In this latter case the member carrying the tongues may be in the form of a nut plate, that is to say a plate which supports a nut and is adapted to be secured, as by rivets, to one of the two members to be connected by the nut and the bolt engaging it.

It will be seen that when a nut according to the invention is screwed on to a bolt, stud or other correspondingly screwthreaded part, the screwthreads on this part, after passing through the nut, will engage and tend to lift the inner end of each tongue in turn, away from the adjacent end of the nut, so that each tongue is maintained by its resilience in firm frictional engagement therewith and thus automatically locks the nut frictionally in the desired position.

Preferably the length of each tongue is such that its inner end before engagement with a bolt or the like lies at a point slightly nearer, for example between one and five-thousandths of an inch nearer, to the axis of the nut than the inner diameter of the thread so that when the nut is applied to a bolt, the end of the bolt lifts the tongue and thus moves its inner end slightly outwards to an extent sufficient to enable the bolt to pass the tongue with the inner end of the latter engaging the base of the thread on the bolt. Thus where, as will generally be the case, a plurality of tongues is provided, the inner ends of the tongues before engagement with a bolt or the like will lie on a circle of slightly less diameter than the core diameter of the screwthreaded part of the bolt.

Figure 2:
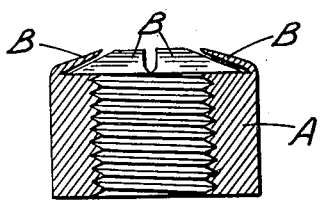

The invention may be carried into practice in various ways but three constructions of nut according to the invention and certain stages in the method of manufacturing one of these constructions are illustrated by way of example in the accompanying drawings, in which Figure 1 is a plan of one form of nut according to the invention, Figure 2 is a section on the line 2—2 of Figure 1.

Figure 3:
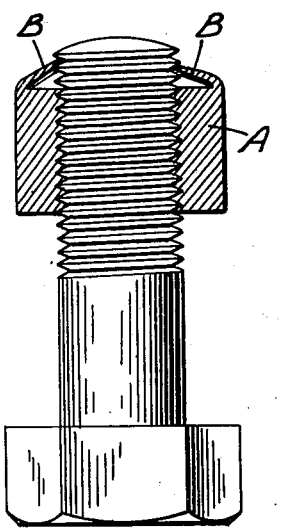
Figure 4:
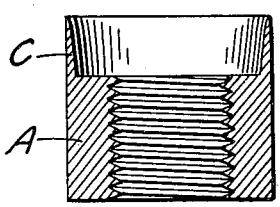
Figure 5:
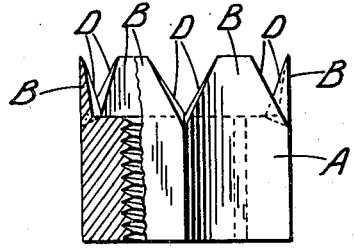

Figure 3 is a similar view to Figure 2 showing the nut applied to a bolt,

Figure 4 is a section through the nut shown in Figures 1, 2 and 3 in a plane containing its axis at one stage in a method of manufacture, Figure 5 is a side elevation partly in section of the nut shown in Figures 1, 2 and 3 at a later stage in such method of manufacture, Figure 6 is a sectional side elevation of an alternative form of nut according to the invention shown applied to a bolt, Figure 7 is a plan view of the nut and bolt shown in Figure 6, Figure 8 is a plan view of part of the nut shown in Figures 6 and 7 before assembly, Figure 9 is a plan view of a still further construction according to the invention, Figure 10 is a section on the line 10—10 of Figure 9, and Figure 11 is a section on the line 11—11 of Figure 9.

In the construction illustrated in Figures 1, 2 and 3, the nut comprises a main body A having the usual hexagonal external contour providing six flats for the application thereto of a spanner and having the usual screwthreaded bore. Formed integral with one end of the body of the nut are a series of tongues B each extending from one of the flats towards the axis of the bore. Each tongue is of tapering form in plan, as shown in Figure 1, and has such length that its inner end lies slightly nearer the axis of the bore than does the smaller diameter part of the screwthread in the bore.

Thus when the nut is applied to a bolt as shown in Figure 3, the end of the bolt as it emerges from the end of the nut engages the tongues B and flexes them until they enter the thread on the bolt whereupon the tongues bear frictionally on the base or the side of this thread and thus hold the nut frictionally from unintentional rotation on the bolt while, however, permitting rotation to be imparted to the nut by a spanner or the like applied thereto. The length and thickness of the tongues B may vary according to requirements but in one arrangement, suitable for example for a half-inch nut, the inner ends of the tongues may lie on a circle having a diameter of between one and five-thousands of an inch less than the smaller diameter of the screwthread.

The method of manufacturing a nut as shown in Figures 1, 2 and 3 may vary but in one convenient way the nut is made from hexagon bar such as is used to make ordinary hexagon nuts. Thus the nuts may be made for example in a turret lathe, the hexagon bar first being drilled and tapped to the required depth to provide the screwthreaded bore and in addition drilled or bored out at one end to an internal diameter which is only a little less than that of the circle to which the flats are tangents so as to form an axially extending flange C as shown in Figure 4. A series of V-shaped grooves D are then cut in this flange C so as to divide it into a series of tongues B as shown in Figure 5, this being effected for example by a grinding wheel in the same way that the slots in a crown nut are cut to receive a split pin.

A suitable die is then moved axially towards the nut so that its interior surface engages the tongues B so as to bend them towards the axis of the bore into the position shown in Figures 1 and 2 and the hexagon bar is then severed to separate the nut thus formed therefrom.

In the construction illustrated in Figures 6, 7 and 8, the nut comprises a hexagonal body part D provided with the usual screwthreaded bore to engage a bolt E. To one end of the body part D is rigidly connected a hexagonal plate F, as shown, formed with a series of inwardly directed tongues $F^1$ the inner end $F^2$ of each of which before the nut is applied to a bolt lies slightly nearer the axis of the bore of the nut than does the smaller diameter part of the screwthread in that bore. The plate F, which, as shown in Figure 8, is initially formed separately from the body D of the nut, is rigidly connected thereto by welding, for example by welding metal applied as shown between the chamfered parts $D^1$ of the face of the nut and the adjacent parts of the plate F.

The self-locking operation of this nut is the same as that of the nut shown in Figures 1, 2 and 3.

In the alternative construction shown in Figures 9, 10 and 11 the hexagonal body part G of the nut is firmly clamped within a nut plate comprising a base H adapted to be secured, as by rivets $H^1$, to one of the two members to be connected by the nut and its bolt, and sides $H^2$ which engage four of the flats on the nut and are formed at their upper ends with tongues $H^3$ which extend inwards over the upper face of the nut to points lying slightly nearer the axis of the bore of the nut than the smaller diameter part of the screwthread in this bore before the nut is applied to a bolt. It will be seen that the nut is rigidly held from axial movement relatively to the nut plate by the part of the plate lying against one face of the nut and the tongues which extend over the other face thereof and is also held firmly from rotational movement relatively to the nut by the parts of the nut plate which engage the flats on the nut.

In this construction also the tongues $H^3$ act to provide self-locking in the same way as the tongues B and $F^1$ respectively in the constructions shown in Figures 1, 2 and 3 and in Figures 6, 7 and 8.

What I claim as my invention and desire to secure by Letters Patent is:

A nut having a screwthreaded bore and comprising a solid body part having a series of flat sides, and a series of resilient metallic tongues of tapered cross-section at one end of the nut each constituting a continuation of one of the flat sides of the nut and the grain thereof and bent inwards towards the axis of the bore of the nut so that its free end lies at a point nearer this axis than does the larger diameter part of the screwthread formed in the bore.

FRED ALBERT ODDIE.